T. J. W. ROBERTSON.
Sewing Machine.
No. 560. Reissued May 18, 1858.
Fig. 1,
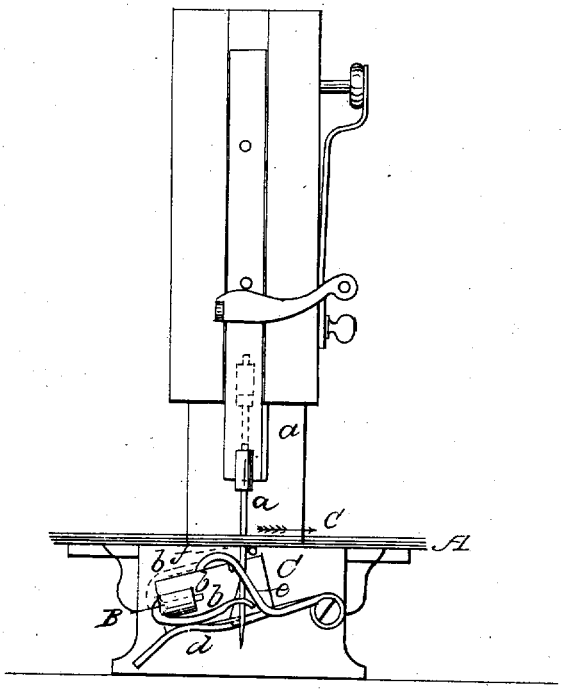
Fig. 2,
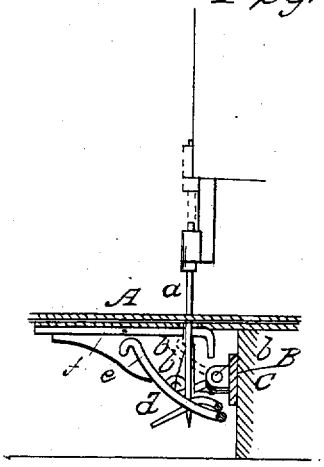
Fig. 3,
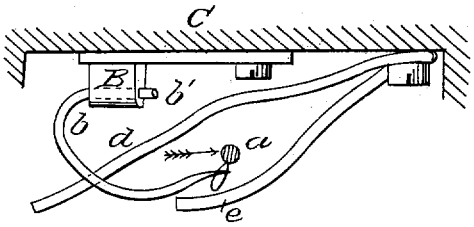
Fig. 4,
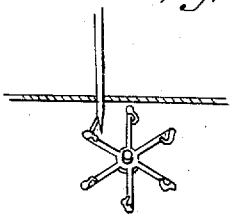
N. PETERS. Photo-Lithographer, Washington, D. C.

UNITED STATES PATENT OFFICE.

T. J. W. ROBERTSON, OF NEW YORK, N. Y.

IMPROVEMENT IN SEWING-MACHINES.

Specification forming part of Letters Patent No. 14.324, dated February 26, 1856; Reissue No. 560, dated May 18, 1858.

*To all whom it may concern:*

Be it known that I, T. J. W. ROBERTSON, of the city, county, and State of New York, have invented a new and useful Improvement in Sewing-Machines; and I do hereby declare that the following is a full, clear, and exact description of the same, reference being had to the accompanying drawings, forming part of this specification, in which—

Figure 1 is a front view of the principal parts of a machine constructed according to my invention. Fig. 2 is a side view of those parts by which the stitch is produced, and Fig. 3 is a plan of the same on an enlarged scale.

Similar letters of reference indicate corresponding parts in the several figures.

This invention consists in a looper of novel character, working in combination with an eye-pointed needle to produce the stitch generally known as the "chain-stitch," with a single thread, said looper and needle being so arranged in relation to each other that the needle shall not only give the loop to the looper, but shall also draw the loop of the point of said looper in its next descent through the cloth.

To enable those skilled in the art to make and use my invention, I will proceed to describe its construction and operation.

*a* is the needle, operated in the same manner as the needle in other sewing-machines. *b* is the looper, arranged below the work-table A of the machine. This looper consists of a curved and pointed piece of metal, whose peculiar form will be understood by reference to the drawings, made with a pivot, *b'*, which is placed in a bearing, B, attached to the stand C of the machine on that side of the needle from which the cloth or other fabric to be sewed is moved toward the needle by the feed-motion. (See Fig. 1, where the direction of the feed is indicated by an arrow, *c*.) The bearing B is inclined to the work-table or face of the cloth, as shown in Fig. 1, where the cloth is indicated by a blue line, but is parallel with the direction of the feed movement, as shown in Fig. 2. The point of the looper is curved toward the middle, (see Fig. 3,) and is also curved slightly downward, as shown in Figs. 1 and 2. When the looper is free, it rests upon a fixed rest, *d*, attached to the stand C of the machine, occupying a nearly horizontal position, as shown in Figs. 1 and 2 in black outline, and in this position the point nearly meets the line of motion of the needle, so that the needle and thread will pass it in their descent through the cloth, but so that as the formation of the loop is commenced by the slackening of the thread when the needle commences rising the thread will pass under the point of the looper, as shown in Figs. 1 and 2, where the thread is shown in blue color, and as the loop is drawn up through the cloth by the continued movement of the needle it catches the said point and swings it up nearly close to the cloth, a little behind where the needle passes through, as shown in red outline in Figs. 1 and 2, leading the loop to such a position that the needle must pass through it in its next descent. The loop is then cast off the point of the looper by the descent of the needle, and as the loop is drawn off the looper falls by gravitation to its first position on the rest *d*, ready to catch the next loop. The fall may, however, be assisted or accelerated by a spring. By the repetition of this operation and the usual feed movement of the cloth, which may be produced by any of the devices commonly employed, a seam or line of stitching is produced.

The operation of the looper is assisted by arranging the eye of the needle obliquely to the seam, as shown in Fig. 3, where the needle is shown in section. This, by causing the thread to wind partly round the needle, enables the needle to give the loop to the looper as it rises. The looper is assisted in holding the loop in a proper position for the needle to pass through by a fixed guide, *f*, of wire, arranged behind the stitching-point of the cloth.

Instead of the oscillating or rising and falling movement of the looper, a rotary movement may be employed by attaching a number of loopers to the pivot *b'*, as shown in the diaphragm, Fig. 4. By this means the movement of each looper by the loop, as described, brings the next one into a position to be caught by the next loop.

What I claim as new, and desire to secure by Letters Patent, is—

Imparting the necessary motion to the looper by means of the thread, substantially as set forth.

T. J. W. ROBERTSON.

Witnesses:

JAMES ROBERTSON,
C. S. NEWELL.